United States Patent
Wobben

(10) Patent No.: US 6,927,502 B2
(45) Date of Patent: Aug. 9, 2005

(54) THREE-PHASE ASYNCHRONOUS MOTOR DRIVEN AZIMUTHAL DRIVE FOR WIND POWER INSTALLATIONS

(76) Inventor: Aloys Wobben, Argestrasse 19, Aurich, D-26607 (DE)

( * ) Notice: Subject to any disclaimer, the term of this patent is extended or adjusted under 35 U.S.C. 154(b) by 179 days.

(21) Appl. No.: 10/276,117

(22) PCT Filed: May 9, 2001

(86) PCT No.: PCT/EP01/05239

§ 371 (c)(1),
(2), (4) Date: Mar. 27, 2003

(87) PCT Pub. No.: WO01/86141

PCT Pub. Date: Nov. 15, 2001

(65) Prior Publication Data

US 2003/0160456 A1 Aug. 28, 2003

(30) Foreign Application Priority Data

May 12, 2000 (DE) .......................................... 100 23 440

(51) Int. Cl.[7] .............................. F03D 9/00; F03D 7/04; F03D 11/04
(52) U.S. Cl. .............................................. 290/44; 416/9
(58) Field of Search ................................ 290/44; 416/9

(56) References Cited

U.S. PATENT DOCUMENTS

| 2,733,393 A | | 1/1956 | Carlisle ....................... 318/743 |
| 4,047,832 A | * | 9/1977 | Sforza ........................... 415/1 |
| 4,066,911 A | * | 1/1978 | Sarchet ......................... 290/44 |

(Continued)

FOREIGN PATENT DOCUMENTS

| DE | 33 06 980 A1 | 9/1984 | |
| DE | 299 200 A5 | 4/1992 | |
| DE | 197 17 059 C1 | 7/1998 | |
| DE | 19955586 A1 | * 6/2001 | ............. H02P/9/48 |
| EP | 0 624 834 A2 | 11/1997 | |
| FR | 1 145 328 | 10/1957 | |
| JP | 6-351273 | 12/1994 | |
| JP | 7-245973 | 9/1995 | |

OTHER PUBLICATIONS

R. Gash, "Windkraftanlagen," B.G. Teubner, Stuttgart, 1999, p. 72 & 90.
Hau, Erich, "Windkraftanlagen," Springer–Verlag, Berlin, 1998, p. 279–281.

*Primary Examiner*—Nicholas Ponomarenko
*Assistant Examiner*—Pedro J. Cuevas
(74) *Attorney, Agent, or Firm*—Seed Intellectual Property Law Group PLLC

(57) ABSTRACT

Wind power installations generally have an active drive for wind direction tracking. The active drive rotates the machine housing of the wind power installation in such a way that the rotor blades of the rotor are oriented in the direction of the wind. That drive which is required for wind direction tracking is generally an azimuthal drive which is usually disposed with the associated azimuthal bearings between the pylon top and the machine housing. One displacement drive is sufficient when small wind power installations are involved, while larger wind power installations are generally equipped with a plurality of azimuthal drives.

The object of the invention is to improve the azimuthal drive for wind power installations so that the above-indicated problems are eliminated, to provide a structurally simple azimuthal drive, to ensure uniform load distribution for each azimuthal drive, and to prevent unwanted torque fluctuations in the individual drives.

A wind power installation comprising a machine housing which accommodates a rotor with at least one rotor blade and a displacement device for displacement of the machine housing for desired orientation of the rotor in the direction of the wind, wherein the displacement device has as a drive a three-phase asynchronous motor which for displacement of the machine housing is acted upon by a three-phase current of variable frequency.

16 Claims, 5 Drawing Sheets

U.S. PATENT DOCUMENTS

| | | | | |
|---|---|---|---|---|
| 4,088,352 A | * | 5/1978 | Kling | 290/55 |
| 4,116,581 A | * | 9/1978 | Bolie | 415/4.4 |
| 4,160,170 A | * | 7/1979 | Harner et al. | 290/44 |
| 4,161,658 A | * | 7/1979 | Patrick | 290/44 |
| 4,189,648 A | * | 2/1980 | Harner | 290/44 |
| 4,193,005 A | * | 3/1980 | Kos et al. | 290/44 |
| 4,305,030 A | | 12/1981 | Lorenz | 318/758 |
| 4,554,980 A | | 11/1985 | Doniwa | 173/12 |
| 4,692,094 A | | 9/1987 | Kulinyak | 416/11 |
| 4,700,081 A | * | 10/1987 | Kos et al. | 290/44 |
| 4,703,189 A | * | 10/1987 | DiValentin et al. | 290/44 |
| 4,871,923 A | * | 10/1989 | Scholz et al. | 290/55 |
| 4,966,525 A | | 10/1990 | Nielsen | 416/9 |
| 5,035,575 A | * | 7/1991 | Nielsen et al. | 416/9 |
| 5,149,998 A | | 9/1992 | Wolcott | 310/105 |
| 5,172,310 A | | 12/1992 | Deam et al. | 363/144 |
| 5,178,518 A | * | 1/1993 | Carter, Sr. | 416/11 |
| 5,198,734 A | | 3/1993 | Johnson | 318/369 |
| 5,213,470 A | * | 5/1993 | Lundquist | 416/9 |
| 5,315,159 A | | 5/1994 | Gribnau | 290/55 |
| 5,374,885 A | | 12/1994 | Küppers et al. | 318/757 |
| 5,447,412 A | | 9/1995 | Lamont | 415/4.2 |
| 5,746,576 A | * | 5/1998 | Bayly | 416/16 |
| 5,828,195 A | | 10/1998 | Zalesski | 318/366 |
| 5,910,688 A | * | 6/1999 | Li | 290/55 |
| 5,977,649 A | * | 11/1999 | Dahill | 290/55 |
| 5,986,370 A | | 11/1999 | Cheng | 310/77 |
| 6,118,678 A | | 9/2000 | Limpaecher et al. | 363/60 |
| 6,261,138 B1 | | 7/2001 | Imura | 440/8 |
| 6,420,795 B1 | | 7/2002 | Mikhail et al. | 290/44 |
| 6,541,877 B2 | * | 4/2003 | Kim et al. | 290/44 |
| 6,710,468 B1 | * | 3/2004 | Marrero O'Shanahan | 290/55 |
| 6,774,504 B1 | * | 8/2004 | Lagerwey | 290/44 |
| 6,800,956 B2 | * | 10/2004 | Bartlett | 290/55 |
| 6,847,128 B2 | * | 1/2005 | Mikhail et al. | 290/44 |
| 6,853,094 B2 | * | 2/2005 | Feddersen et al. | 290/44 |
| 6,856,039 B2 | * | 2/2005 | Mikhail et al. | 290/44 |
| 6,856,040 B2 | * | 2/2005 | Feddersen et al. | 290/44 |
| 6,856,041 B2 | * | 2/2005 | Siebenthaler et al. | 290/44 |

* cited by examiner

THREE-PHASE ASYNCHRONOUS MOTOR DRIVEN AZIMUTHAL DRIVE FOR WIND POWER INSTALLATIONS

Wind power installations generally have an active drive for wind direction tracking. The active drive rotates the machine housing of the wind power installation in such a way that the rotor blades of the rotor are oriented in the direction of the wind. That drive which is required for wind direction tracking is generally an azimuthal drive which is usually disposed with the associated azimuthal bearings between the pylon or tower top and the machine housing. One displacement drive is sufficient when small wind power installations are involved, while larger wind power installations are generally equipped with a plurality of azimuthal drives.

In the wind direction tracking procedure of the machine housing, an operating wind-measuring system supplies a mean value for the wind direction over a certain period of time, for example 10 seconds. That mean value is repeatedly compared to the instantaneous azimuthal position of the machine housing. As soon as a deviation exceeds a given value, the machine housing is suitably re-adjusted so that the wind direction deviation of the rotor, being the yaw angle, is as small as possible in order to avoid power losses. The way in which wind direction tracking is implemented in known wind power installations is described in "Windkraftanlagen" ("Wind Power Installations"), Erich Hau, second edition, 1995, pages 268 ff and 316 ff respectively.

In previously known wind power installations, motor-powered wind direction tracking of the machine housing, the azimuthal displacement system, takes over the function of automatically orienting the rotor and the machine housing according to the wind direction. When considered functionally, the wind direction tracking system is an independent unit. When considered from the point of view of structure, it forms the transition of the machine housing to the pylon top. The components thereof are integrated in part in the machine housing and in part in the pylon top. The overall system for wind direction tracking comprises the components consisting of the setting drive, holding brakes, locking device, azimuthal bearings and regulating system. Those components operate as follows:

For the setting drive, there are the alternatives hydraulic or electrical, in a similar manner as for the rotor blade displacement drive. Both design configurations are usual in relation to wind power installations. Small installations mostly have unregulated electrical drive motors. In the case of large installations, hydraulic setting drives are in the majority.

A rotary movement-check arrangement or a yaw brake is required in order to prevent the yaw moment about the axis of rotation having to be held after the tracking operation has been effected, by drive motors. Otherwise, the service life of the drive assemblies or the upstream-connected transmission assemblies could scarcely be guaranteed. Small installations are generally satisfied with a rotary movement-check arrangement in the azimuthal bearing, while a plurality of releasable holding brakes are known for larger installations. The holding brakes engage a braking ring at the inside of the pylon or conversely a ring on the machine housing. During the tracking operation one or two azimuthal brakes are in engagement in order to guarantee the required damping action for the displacement dynamics. In this case the setting drive must be designed in such a way that it can perform the tracking movement against that frictional damping action. The azimuthal or pylon top bearing is usually in the form of a rolling bearing assembly.

FIG. 7 is a partly sectional view of a known wind direction tracking system with an electrical setting drive from Westinghaus WTG-0600.

During operation of a wind power installation with turbulent winds—in dependence on the angle of rotation of the rotor—very high forces occur and, linked thereto, high and frequent load peaks in the azimuthal drives.

If there is more than one azimuthal drive, the situation additionally involves a very high degree of asymmetry in the individual drives. Those drives have a step-up transmission ratio by means of a transmission assembly of around 15,000. Very minor deviations in the tooth configuration at the periphery of the pylon bearing result immediately in very severe asymmetries if more than one drive, for example four azimuthal drives, are mounted at the periphery of the pylon bearing with an integrated tooth arrangement. Because of the high transmission step-up ratio those small deviations on the input side of the drive correspond to up to 15 to 20 revolutions on the output side.

In consequence this means that, during and after each rotational procedure for the machine housing, the entire load and the entire torque must be simultaneously distributed if possible uniformly to individual drives. In addition, when heavy azimuthal loads are involved, the drives should yield during the stoppage times when excessively high load levels occur, and permit easy rotary movement of the machine housing so that a suitable load relief effect can occur.

In addition, during wind tracking of the machine housing of the wind power installation, in the event of severe turbulence, correspondingly high torques also occur. They excite the azimuthal drives in such a way that the motors oscillate relative to each other. In that case the transmission arrangements with their very high step-up transmission ratio react like a spring and the consequence is major torque fluctuations in the individual drives.

The object of the invention is to improve the azimuthal drive for wind power installations so that the above-indicated problems are eliminated, to provide a structurally simple azimuthal drive, to ensure uniform load distribution for each azimuthal drive, and to prevent unwanted torque fluctuations in the individual drives.

In accordance with the invention there is proposed a wind power installation as set forth in claim 1. Advantageous developments are described in the appendant claims.

The wind power installation according to the invention comprising a machine housing which accommodates a rotor with at least one rotor blades is distinguished in that the displacement device for displacement of the machine housing in accordance with the respective wind direction has as its azimuthal drive at least one three-phase asynchronous motor which is supplied with three-phase current during displacement of the machine housing and at times or completely with direct current during the stoppage time of the machine housing.

After the displacement operation by means of three-phase current the motors are switched off and thus no longer produce any torque. In order now also to provide for a braking action on the part of the drive motor and in order still to maintain an adequate braking torque during the stoppage time when load peaks occur, the three-phase asynchronous motor is acted upon by a direct current immediately after separation from the three-phase network. That direct current generates a stationary magnetic field in the asynchronous motor which is thereby immediately decelerated. As far as possible the direct current supply is maintained during the entire stoppage time.

In accordance with the invention there is provided a torque control for suppressing unwanted torque fluctuations.

Deceleration of the three-phase asynchronous motor can be set linearly by means of the magnitude of the direct current. That affords a simple torque control for the azimuthal drives of wind power installations during the actual stoppage phase.

In addition, if the displacement device has a plurality of three-phase asynchronous motors, the three-phase asynchronous motors are coupled in negative feedback relationship by means of a current transformer so that the individual drive is stabilised and the hitherto unwanted spring effect is suppressed.

The invention is described in greater detail hereinafter by means of an embodiment with reference to the drawings in which:

FIG. 1 is a diagrammatic arrangement of four azimuthal drives of a displacement device on the machine housing, FIG. 2 shows a torque/rotary speed characteristic curve of a three-phase asynchronous motor, FIG. 3 shows the characteristic curve of a three-phase asynchronous motor in a direct-current mode of operation, FIG. 4 shows an alternative view in relation to FIG. 3, FIG. 5 shows a block circuit diagram of a current transformer coupling of two asynchronous azimuthal drives, FIGS. 6a and 6b show block circuit diagrams FIG. 7 is a partly sectional view of a known wind tracking arrangement with an electric setting drive, and FIG. 8 shows a block circuit diagram of an asynchronous machine actuated with a frequency converter.

Wind power installations generally have an active drive for wind direction tracking. The active drive rotates the machine head of the wind power installation in such a way that the rotor blades of the rotor are oriented in optimum fashion in the direction of the wind. The active drive for wind direction tracking is an azimuthal drive 1 with the associated azimuthal bearing 2 and is generally disposed between the pylon top and the machine housing. In the case of small wind power installations one azimuthal drive is sufficient, while larger wind power installations usually have a plurality of drives, for example four drives as shown in FIG. 1. The four drives are distributed uniformly around the periphery of the pylon top 3 (a non-uniform distribution is also possible).

During operation of a wind power installation with turbulent winds—in dependence on the angle of rotation of the rotor—very high forces occur and, linked thereto, high and frequent load peaks in the azimuthal drives.

If the displacement device for displacement of the machine head has more than one azimuthal drive 1, a very high level of asymmetry additionally occurs in the individual drives 1. The drives have a step-up transmission arrangement 4 (transmission arrangement: not shown) with a step-up transmission ratio of about 15,000. Very small deviations in the tooth configuration of the transmission arrangements at the periphery of the pylon bearing result immediately in very severe levels of asymmetry if more than one drive is mounted at the periphery of the pylon bearing with an integrated tooth configuration. Because of the high transmission ratio those minor deviations on the input side of the drive correspond to up to 15 to 20 revolutions on the output side.

That means that, during and after each rotary procedure of the pylon top, the entire load/torque must be distributed uniformly to individual drives. In addition, in the event of heavy azimuthal loads, the drives should yield during the stoppage times—of the pylon top—in the event of excessively high loads, and permit a slight rotary movement of the machine head.

Each azimuthal drive 1 has its own motor 5 and the motors are interconnected and are controlled jointly. If, during the wind tracking movement of the machine head of the wind power installation—caused by severe turbulence—major torques occur, those torques excite the azimuthal drives in such a way that the motors oscillate relative to each other or have a tendency to perform oscillations. The transmission arrangements 4 with their very high ratio react in that case like a spring, which results in major torque fluctuations in the individual drives.

In order to ensure uniform distribution of the loads during the time when the machine housing is not being rotated, it is proposed in accordance with the invention that, as drive motors for the azimuthal drive, a three-phase asynchronous motor is used as the asynchronous drive machine. The torque/rotary speed characteristic curve thereof is shown in FIG. 2. $M_A$ denotes the initial torque and $M_K$ denotes the pull-out torque.

After the machine housing displacement operation the four three-phase asynchronous motors (ASM) are switched off and thus no longer produce any torque. In order to uniformly decelerate the motors and also thereafter still to obtain a braking torque, the motors are supplied with a direct current promptly after separation from the three-phase network, as far as possible immediately (see FIG. 6a).

That direct current produces a stationary magnetic field in the motors (asynchronous machine) which are thus immediately decelerated. That direct-current supply is maintained as far as possible during the entire stoppage time and can be regulated in respect of amplitude.

After the displacement operation the ASM-drives are supplied with a regulated direct current by means of a regulating device, as shown in FIG. 6b. Slow rotary movements of the pylon top which are caused by asymmetrical gusts of wind are only damped or attenuated by a low direct current (about 10% of the nominal current), but they are permitted. Faster rotary movements are prevented by a suitably adapted higher direct current and thus a higher braking moment. In the event of very fast rotary movements, the direct current is raised to the nominal current of the motor.

The torque/rotary speed characteristic curve of an asynchronous motor in the direct current mode of operation is shown in FIG. 3. The drive motor does not generate any torque with direct current magnetisation in the stopped condition. With increasing rotary speed however—up to about 6% of the nominal rotary speed—the torque generated rises linearly and this is symmetrical in both directions of rotation. In accordance with that characteristic curve, the load occurring is also distributed uniformly to all azimuthal drives and an equilibrium condition always passively occurs.

To provide for torque control in respect of the azimuthal drives, the gradient of the braking curve can be set linearly with the magnitude of the direct current. That is shown in FIG. 4. That affords a simple torque control for the azimuthal drives of wind power installations during the actual stoppage phase.

It is further appropriate for the individual motors of the azimuthal drives to be couple by means of a current transformer. That is shown in FIG. 5. In this case ASM denotes an asynchronous machine. Such a simple negative feedback as illustrated stabilises the drives.

Figure 1:
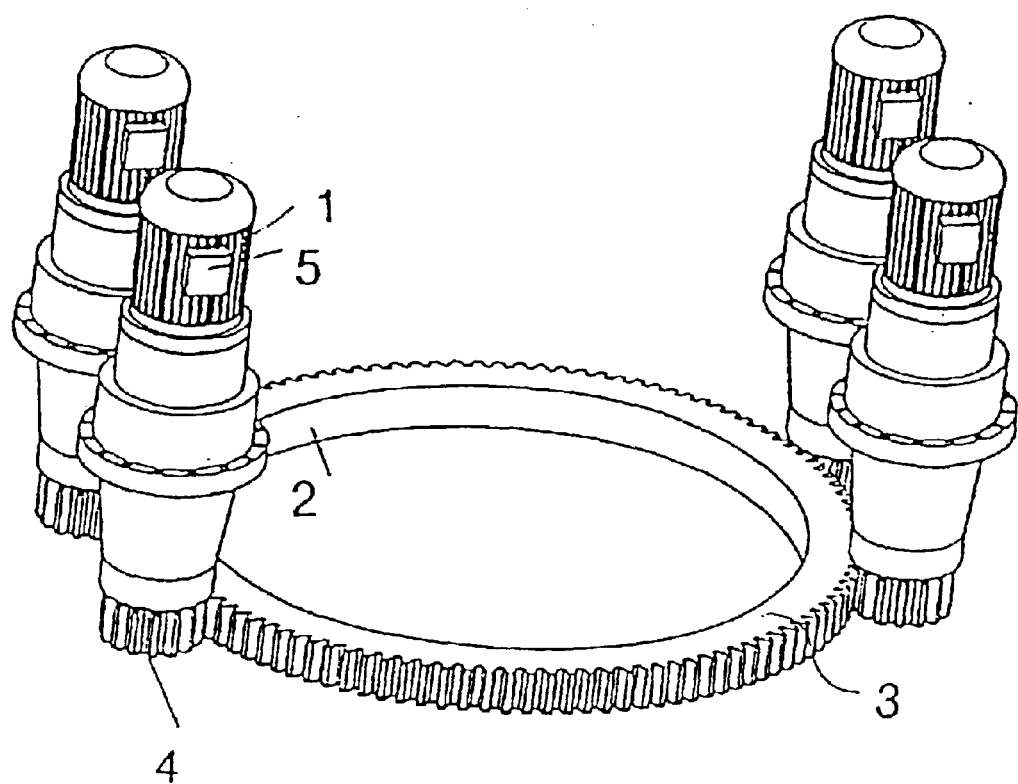
Figure 2:
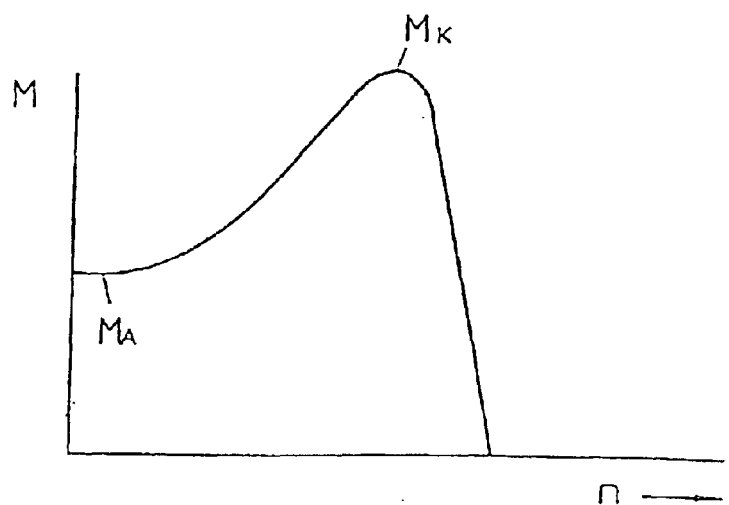
Figure 3:
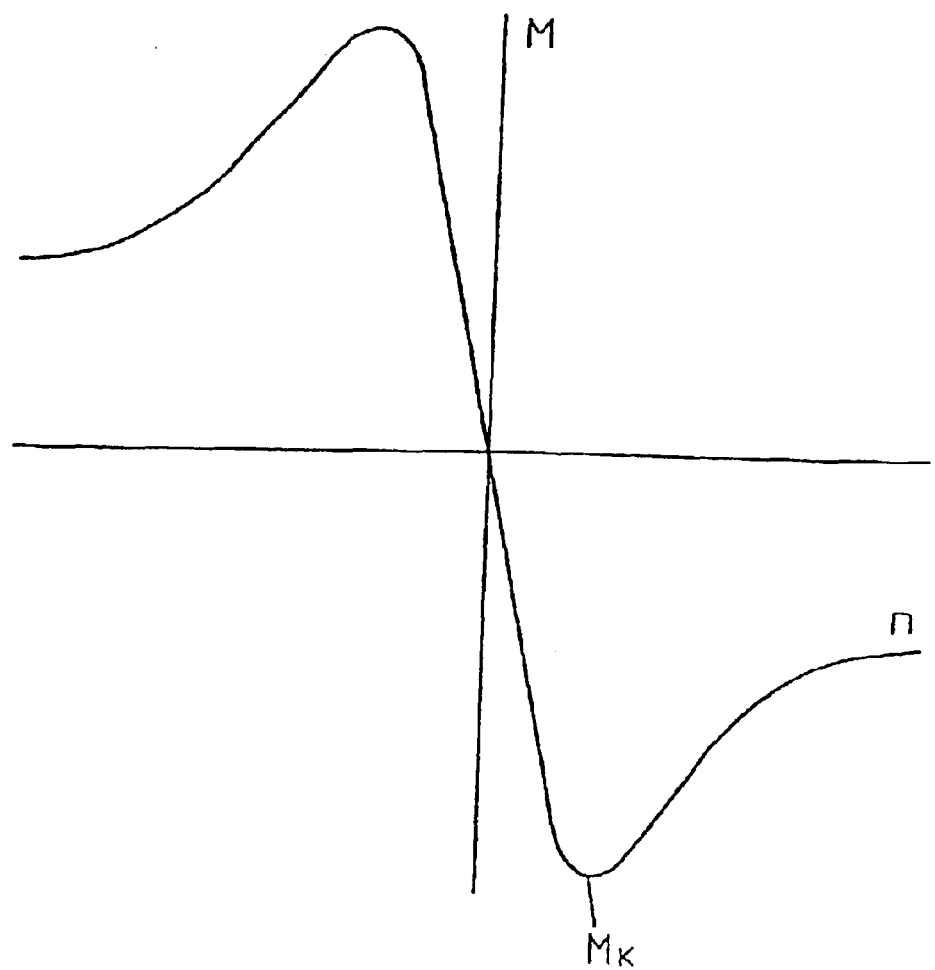
Figure 4:
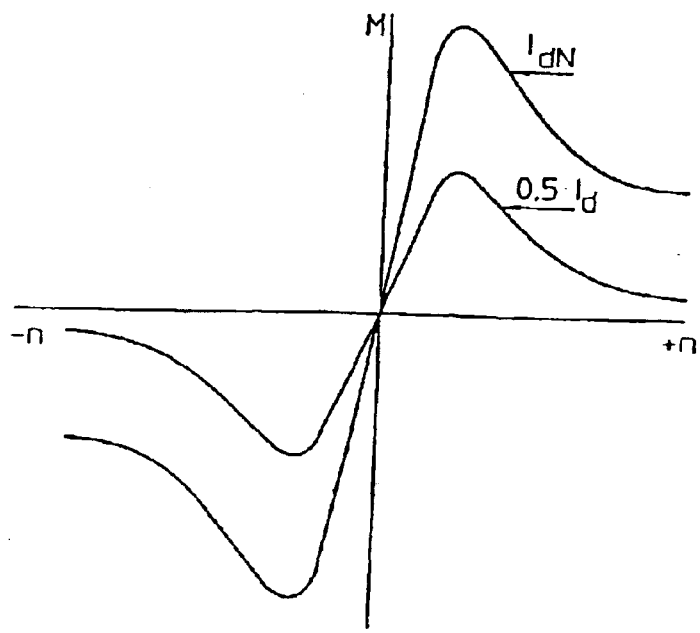
Figure 5:
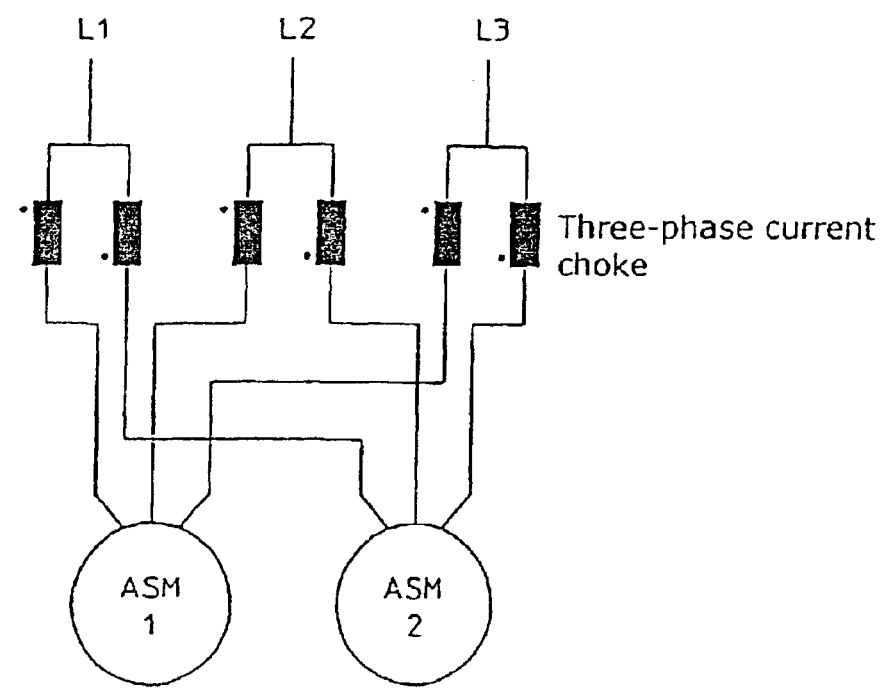
Figure 6A:
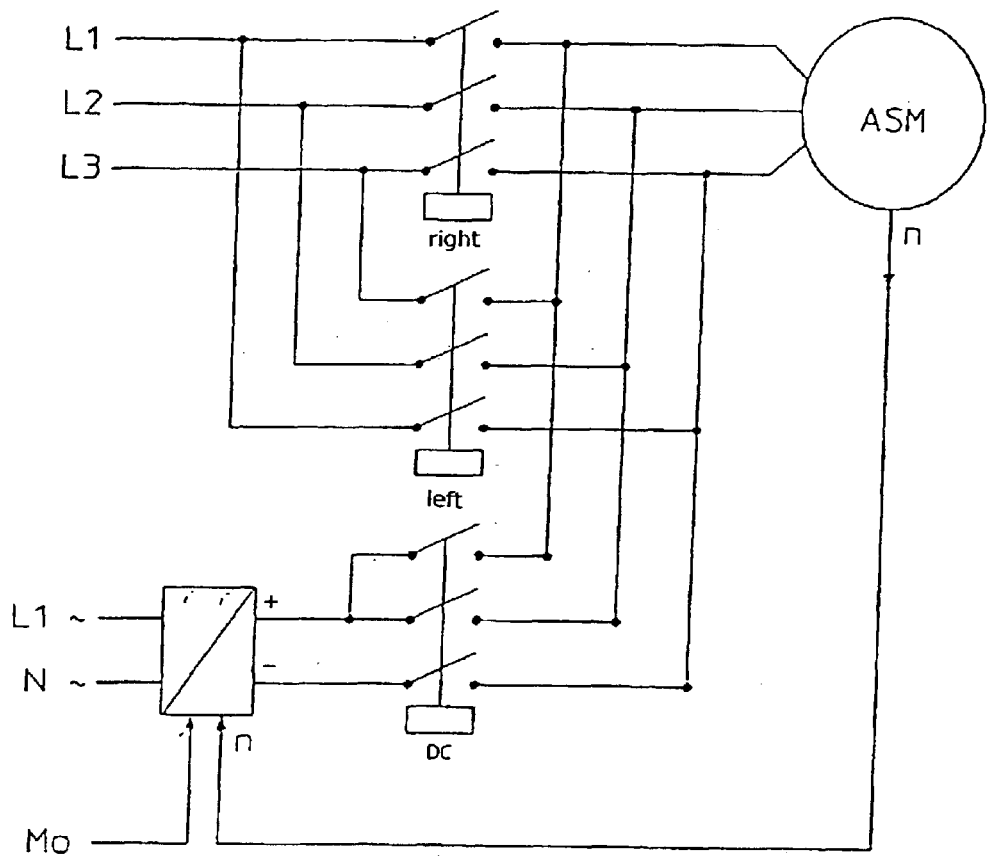
Figure 6B:
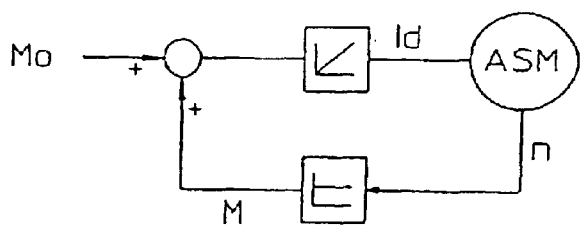
Figure 7:
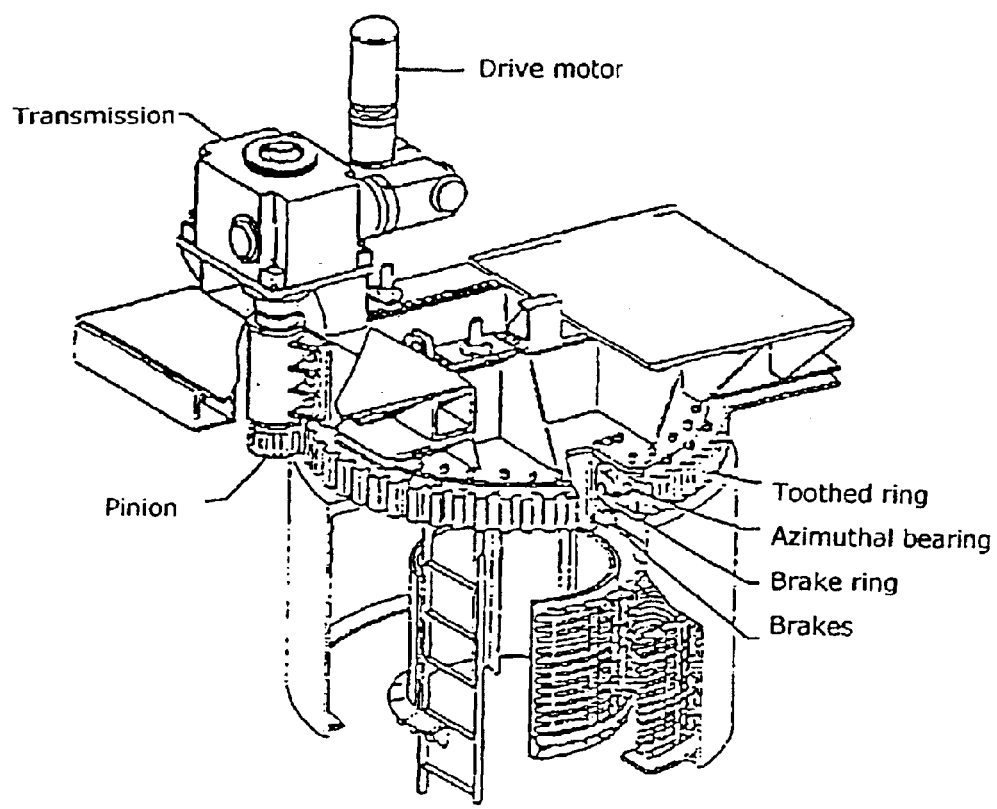
FIG. 7 shows a partly sectional view of a known wind direction tracking arrangement with an electrical setting drive, as is known from Erich Hau, "Windkraftanlagen" ("Wind Power Installations"), Springer-Verlag Berlin Heidelberg 1996, pages 268–271.
Figure 8:
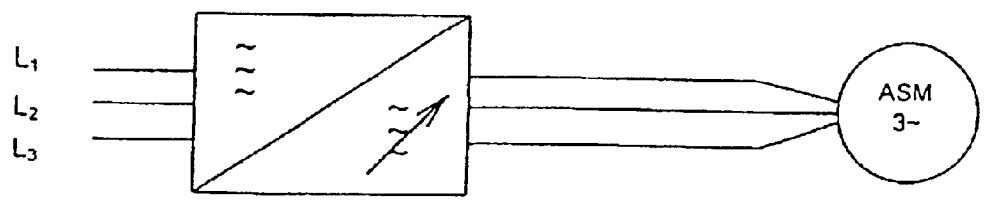
FIG. 8 shows a block circuit diagram illustrating how an asynchronous machine connected to a frequency converter, preferably a three-phase asynchronous motor, is supplied with electric current.

During the displacement procedure of the three-phase asynchronous motor, when therefore the machine housing of the wind power installation is being set (rotated) to a desired position the asynchronous motor is supplied with a three-phase current of variable frequency.

During the stoppage time of the asynchronous machine the asynchronous machine is supplied with a three-phase current at a frequency of zero Hz, that is to say direct current.

What is claimed is:

1. A wind power installation comprising:
    a machine housing having a rotor with at least one rotor blade and a displacement device for displacement of the machine housing for orientating the rotor in a direction of a wind, the displacement device including a drive having a three-phase asynchronous motor configured to drive the displacement device in response to a three-phase current of variable frequency and to generate a braking moment in response to a direct current received during a stoppage time of the machine housing.

2. A wind power installation according to claim 1, further comprising a frequency converter configured to supply the three-phase current and the direct current to the three-phase asynchronous motor.

3. A wind power installation according to claim 1 wherein the displacement device includes a plurality of three-phase asynchronous motors.

4. A wind power installation according to claim 3 wherein the three-phase asynchronous motors are electrically coupled to a current transformer.

5. A wind power installation according to claim 1 wherein a magnitude of the direct current is set linearly to a gradient of a braking curve during the stoppage time.

6. A wind power installation according to claim 1, further comprising:
    a regulating device configured to regulate a magnitude of the direct current.

7. A yaw control system for a wind power installation comprising:
    yaw orientation means for rotatably positioning a machine housing of the wind power installation, the machine housing including at least one rotor blade coupled to a rotor;
    transmission means for coupling the yaw orientation means to the machine housing; and
    means for driving the transmission means, the means for driving configured to respond to a three-phase current by rotationally displacing the machine housing and to respond to a direct current after the three-phase current is switched off by decelerating the transmission means and providing a braking torque for the yaw orientation means.

8. The yaw control system of claim 7 wherein the yaw orientation means comprises a toothed pylon.

9. The yaw control system of claim 7 wherein the transmission means comprises a toothed device for complementarily engaging the toothed pylon.

10. The yaw control system of claim 7 wherein the three-phase current is of a variable frequency.

11. A method of controlling a yaw displacement device in a wind power installation, the method comprising:
    supplying a three-phase current to a motor of the yaw displacement device to cause a machine housing of the wind power installation to be rotationally displaced; and
    supplying a direct current to the motor to decelerate the motor and provide a braking torque.

12. The method of claim 11 wherein supplying a three-phase current to a motor includes supplying a three-phase current to an asynchronous motor.

13. The method of claim 11 wherein supplying the direct current includes supplying the direct current when the three-phase current to the motor is switched off.

14. The method of claim 11, further comprising:
    regulating the direct current with a regulating device.

15. The method of claim 11 wherein supplying a direct current to the motor to decelerate the motor includes uniformly decelerating the motor.

16. The method of claim 11 wherein supplying a direct current to the motor to decelerate the motor and provide a braking torque includes halting a rotational displacement of the machine housing.

* * * * *